3,251,737
METHODS FOR INHIBITING GASTRIC SECRETIONS WITH SUBSTITUTED BIURETS
Francis Learmonth Chubb, Pierrefonds, Quebec, and John Duncan McColl, Dorval, Quebec, Canada, assignors to Frank W. Horner Limited, Montreal, Quebec, Canada
No Drawing. Filed Dec. 27, 1962, Ser. No. 247,486
Claims priority, application Canada, Nov. 5, 1962, 861,669
7 Claims. (Cl. 167—55)

This invention relates to novel biurets, to their process of production and to novel pharmaceutical preparations containing such biurets.

The biurets constituting one aspect of the present invention are phenylbiurets having the following general structure

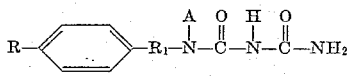

where
R is a radical selected from the group consisting of hydrogen, methyl an methyoxy
$R_1$ is a hydrocarbon radical having 2–4 carbon atoms, and
A is a radical selected from the group consisting of hydrogen and methyl.

In general, the biurets of the present invention may be prepared according to another aspect of this invention by reacting nitrobiuret with the required amine, according to the reaction

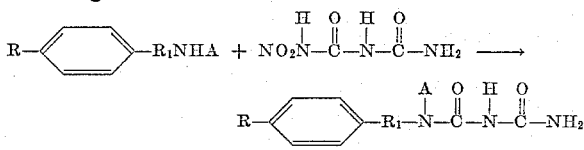

By yet another aspect of the present invention there is provided a pharmaceutical preparation for the inhibition of gastric secretions comprising a biuret having the general formula

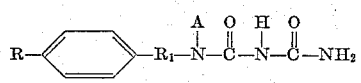

wherein
R is a radical selected from the group consisting of hydrogen, methyl and methoxy,
$R_1$ is an alkylene hydrocarbon radical having 2 to 4 carbon atoms, and
A is radical selected from the group consisting of hydrogen and methyl, and a pharmaceutically acceptable orally ingestible carrier.

Of particular interest according to the present invention are

Phenethylbiuret

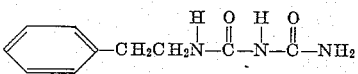

3-phenylpropylbiuret

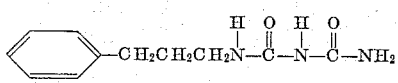

and 4-phenylbutylbiuret

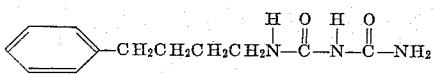

The procedure for the preparation of a series of buirets is given by the following examples.

EXAMPLES 1–6

Nitrobiuret and the required amine in equimolar quantities were brought together in water. The amount of water was generally 50 ml. per 0.05 mole of reactants. The mixture was allowed to stand for one hour with occasional shaking. Stirring was used in the case of water insoluble amines. The mixture was then heated gradually to boiling and refluxed for 20 minutes to one hour, depending on the reactivity of the amine. The product crystallized upon cooling. In the case of the more water soluble amines, concentration was necessary. The products were recrystallized to constant melting point from ethanol or ethanol-water mixtures.

The reactants, products and characteristics thereof are given below in Table I.

Table I

| Example | Amine | | | Biuret | | | | | |
|---|---|---|---|---|---|---|---|---|---|
| | R | $R_1$ | A | R | $R_1$ | A | Recrystallized from— | M.W. | M.P., °C. |
| (1) Phenethylbiuret | H | $(CH_2)_2$ | H | H | $(CH_2)_2$ | H | Ethanol-water | 207.2 | 140–141 |
| (2) N-methylphenethylbiuret | H | $(CH_2)_2$ | $CH_3$ | H | $(CH_2)_2$ | $CH_3$ | do | 221.2 | 147–148 |
| (3) 3-phenylpropylbiuret | H | $(CH_2)_3$ | H | H | $(CH_2)_3$ | H | do | 221 | 141–142 |
| (4) 4-phenylbutylbiuret | H | $(CH_2)_4$ | H | H | $(CH_2)_4$ | H | do | 235 | 135–136 |
| (5) p-Tolylethylbiuret | $CH_3$ | $(CH_2)_2$ | H | $CH_3$ | $(CH_2)_2$ | H | do | 223 | 174–175 |
| (6) p-Methoxyphenethylbiuret | $OCH_3$ | $(CH_2)_2$ | H | $OCH_3$ | $(CH_2)_2$ | H | do | 239 | 159–160 |

The biurets of the present invention have been found to be especially useful as a gastric secretion inhibitor and hence are useful in the treatment of stomach ulcers. In addition, the compounds possess nervous system depressant action.

Phenethylbiuret was tested for its effect in pyloric-ligated rats according to the technique of Shay et al., "Gastroenterol," 5, 43 (1945).

Basically the procedure employed to study the action of various compounds has been to use 72 hour fasted Sprague-Dawley rats. Pyloric ligation was performed under ether anesthesia. Test compounds were administered by the subcutaneous route in two equally divided doses: one immediately following ligation and the other 4 hours later. In one set of experiments the compound was administered by the intraduodenal route (below the ligation). In this case only one dose was given. Eight hours following ligation the animals were killed, stomach contents were aspirated and the volume measured. The stomach was removed and fixed in formalin for macro and microscopic examination. Free and total acid and pH of the gastric fluid was determined by appropriate methods.

The ulcer formation was quantitated by both macroscopic examination and microscopic assessment of stained sections. The method may be described as follows:

Degree of ulceration was grossly assessed by low power examination of fresh tissue and by microscopic examination of fixed sections stained with hematoxylin and eosin. Four grades indicated the severity of ulceration, as follows:

*Grade 1.*—A mild lesion, which could also be called a denuded area. The only significant finding was a superficial ulcer involving the epithelial layer. General features of inflammation such as slight edema, congestion or cellular infiltration were present.

*Grade 2.*—This lesion involved the epithelial layer as well as the muscularis mumosae, and inflammatory signs were more pronounced.

*Grade 3.*—A severe ulcer formation involving the whole stomach wall, excepting the main muscle coat which might be infiltrated by inflammatory cells but was mainly intact; usually accompanied by heavy inflammation (cellular exudate, edema) and severe vascular phenomena (necrosis of vascular wall, haemorrhage rather than congestion, and thrombus formation).

*Grade 4.*—An extremely severe ulcer destroying the whole stomach wall, and presenting the picture of perforation. Extreme degrees of inflammation and necrosis were usually present, frequently accompanied by extensive haemorrhage because of widespread destruction of vascular structures.

Number of lesions as well as severity of ulceration was included in the final evaluation.

The ulcer formation, parameters of inflammation cellular infiltrate, edema), vascular phenomena (vascular wall necrosis, congestion, haemorrhage, thrombus formation) and necrosis were taken into consideration individually in the microscopic evaluation. These parameters were also characterized from Grade 1 to Grade 4. The total score was summed for each group to give an "ulcer index."

In each set of experiments a control group was included for comparative purposes. Results on the gastric fluid volume, pH, free and total acid concentration, and ulceration index of all controls were pooled at the end of the study—representing a mean of 105 animals.

An "ulcer index" was defined on the basis of this microscopic examination.

Groups of five rats were used for each dose level tested and a control group was included in each set of experiments. At the end of the experiments the data from all controls were pooled. The order of the standard error of the means (S.E.M.) is indicative of the relative uniformity of the results obtained. Appropriate reference compounds were also employed.

The results of this test are given below in Tables II and III.

*Table II—Action of phenethylbiuret and reference compounds on pyloric-ligated rat*

| Treatment | Dose, mg./kg. | Gastric vol., mls./100 gm. B.W. ±S.E.M. | pH | Acid concentration, mls. 0.01 N NaOH±S.E.M. | | Macroscopic Ulcer Rating | Ulcer Index |
|---|---|---|---|---|---|---|---|
| | | | | Free | Total | | |
| Control | | 4.2±0.2 | 1.5 | 50±1.8 | 105±2.1 | 9.0±0.6 | 37.2±2.8 |
| Phenethylbiuret | 50 S.C. | 3.3±0.5 | 1.3 | 53±9 | 111±10 | 6.0 | 22.5 |
| | 62.5 S.C. | 3.5±0.6 | 4.2 | 40±7 | 108±9 | 9.5 | 18.5 |
| | 125 S.C. | 2.2±0.8 | | 27±11 | 80±12 | 3.5 | 14.0 |
| | 250 S.C. | 0.8±0.1 | 5.5 | 0 | 45±9 | 1.5 | 10.0 |
| | 400 S.C. | 1.2±0.3 | 3.4 | 0 | 26±9 | 0 | 5.5 |
| | 500 S.C. | 0.9±0.1 | 4.9 | 2±0.6 | 70±10 | 0 | 3.0 |
| | 188 I.D. | 1.0±0.3 | 1.5 | 60±9 | 108±14 | 1.0 | 13.5 |
| | 375 I.D. | 0.1±0.04 | 4.1 | 0 | [1] 46 | 1.5 | 15.5 |
| Atropine | 25 S.C. | 0.5±0.04 | 4.5 | 0 | [1] 20 | 1.0 | 4.5 |
| | 50 S.C. | 0.6±0.05 | 6.5 | 0 | [1] 17 | 1.5 | 5.5 |
| Phenobarbital | 50 S.C. | 5.4±0.5 | 1.2 | 71±11 | 126±13 | 7.5 | 37.5 |
| | 100 S.C. | 0.7±0.1 | 5.6 | 0 | 76±10 | 3.5 | 14.5 |
| Meprobamate | 200 S.C. | 3.2±0.5 | 1.3 | 54±3 | 122±8 | 7.5 | 30.0 |
| | 400 S.C. | 0.6±0.9 | 2.6 | 0 | 83±7 | 3.0 | 7.0 |
| Adiphenine | 200 S.C. | 0.4±0.05 | 3.8 | 0 | 8.7±12 | 1.0 | 3.0 |
| Acetzolamide | 1,000 S.C. | 0.9±0.05 | 5.6 | 0 | 47±11 | 4.5 | 16.0 |

[1] Pooled sample no S.E.M. Calculated.

*Table III*

| Compound | Mouse IP LD$_{50}$, mg./kg. | Dose rat IP, mg./kg. | Gastric vol., ml./100 gm.± S.E.M. | pH | Acid Meq±S.E.M. | | Macroscopic ulcer rating | Ulcer Index |
|---|---|---|---|---|---|---|---|---|
| | | | | | Free | Total | | |
| Control | | | 4.2±0.2 | 1.5 | 50±1.8 | 105±2.1 | 9.0±0.6 | 37.2±2.8 |
| FWH-413 | 1,309(1,140–1,480) | 400 | 3.9±1.5 | 2.9 | 7±14 | 40±22 | 1.0 | 10.0 |
| FWH-414 | 800(725–880) | 400 | 0.7±0.2 | 3.1 | 13±10 | 120±14 | 0 | 9.0 |
| FWH-453 | 690(627–759) | 250 | 1.6±0.5 | 3.2 | 0 | 52±10 | 0 | 1.5 |
| FWH-461 | 1,600(1,430–1,795) | 200 | 1.9±0.8 | 2.2 | 20±7 | 70±12 | 1.5 | 14 |
| FWH-455 | 780(685–890) | 250 | 2.0±0.9 | 1.9 | 37±7 | 92±7 | 1.0 | 10.0 |
| FWH-472 | >2,000 | 400 | 1.6±0.2 | 1.6 | 32±11 | 116±21 | 4.0 | 150 |

NOTES:
FWH-413=benzyl biuret.
FWH-414=N-methyl phenethyl biuret.
FWH-453=3-phenylpropyl biuret.
FWH-461=p-methoxyphenethyl biuret.
FWH-455=4-phenylbutyl biuret.
FWH-472=p-tolylethyl biuret (p-methyl phenethyl biuret).

As shown above, Table II summarizes the results obtained by both subcutaneous and intraduodenal administration of phenethylbiuret. Gastric secretion was decreased relative to controls at a dose of 50 mg./kg.: higher doses produced a progressive decrease in secretion, however a plateau-effect appeared at doses of 250–500 mg./kg. Free and total HCl concentration was significantly decreased at doses in excess of 62.5 mg./kg. pH reflected the alteration in acid concentration.

Both macroscopic ulcer rating and the microscopic "ulcer index" demonstrated the protective action of phenethylbiuret on the incidence and severity of ulcer formation. All doses significantly inhibited the "ulcer index" and demonstrated a dose-response effect.

By the intraduodenal route, phenethylbiuret was more inhibitory to the gastric secretion and, at the higher dose, decreased free and total acid concentration. Inhibition of the ulcer formation was in the same order as approximately comparable doses given by the subcutaneous route. It should be noted that the inraduodenal administration was given *once* as opposed to the two equally divided subcutaneous doses.

As seen in Table III, depending upon the dose, all derivatives inhibited gastric secretion to some degree. The most potent compounds other than phenethylbiuret where the compounds FWH–414 and 453, FWH–413: (benzyl biuret) was the least potent.

In addition to these studies the action of phenethylbiuret was investigated by a variety of other test methods. These include:

(1) Anti-chromodacryorrhea (bloody tears) test for parasympatholytic action, according to Winbury et al., J.P.E.T. 95, 53 (1949);

(2) Intestinal motility according to Visscher et al., J.P.E.T. 110, 188 (1954);

(3) Antagonism of histamine-induced gastric secretion, according to Wood, Brit. J. Pharmacol. 3, 231 (1948);

(4) Effect on hexobarbital and ether-induced loss of righting reflex;

(5) Conditioned avoidance behaviour according to Cook and Weidley, Ann. N.Y. Acad. Sci. 66: 740 (1957), and (6) Action against pentylenetetrazole, picrotoxin, strychnine and nicotine-induced clonic seizures.

The results of these tests are shown below in Table IV.

both pentylenetetrazole and nicotine clonic convulsions were antagonized.

The conditioned avoidance response was significantly antagonized in the rat but a neurological deficit occurred at higher doses which suggests a non-specific inhibition or only a very weak action of the compound in this test.

Hexobarbital-induced loss of righting reflex was weakly potentiated by phenethylbiure in the mouse. Ether-induced loss of the reflex in the rat was more prolonged.

The compound demonstrated an inhibitory action on a monosynaptic reflex (patellar reflex) and polysynapic reflex (linguomandibular) in the cat. The I.V. $ED_{50}$ was approximately 40 mg./kg. and subsequent doses markedly depressed the polysynaptic reflex.

It has also been found that FWH–292 did not antagonize acetylcholine-induced fall in blood pressure of the rat. The insoluble nature of FWH–292 was found to preclude testing for anticholinergic activity in the usual way by in vitro methods. The antispasmodic activity was tested using the charcoal meal test in the rat. It was found that FWH–292 did not have any effect on intestinal motility at doses of 200 and 400 mg./kg. (S.C.). Atropine, by the same test, produced a 50% inhibition at a dose equivalent to 0.6 mg./kg. Also, when tested by the anti-chromodacylorrhea test, it failed to demonstrate anticholinergic properties. Accordingly, it appears that the biurets of the present invention produce inhibitory effects on gastric secretion without possible side effects due to anticholinergic activity.

In the cat intravenous doses of 100 mg./kg. produced approximately 50% decrease in histamine-induced gastric secretion in 3 of 4 cats. There was no effect on free or total acid concentration.

In summary, phenethylbiuret and phenylpropylbiuret were observed to be the most active of the series of substituted biurets studied.

The biurets of the present invention may be formed into pharmaceutical preparations by admixture with pharmaceutically acceptable, ingestible carrier. A suitable form of the pharmaceutical preparation would be a suppository containing 250 mgs. to 1 gram of active ingredient. The recommended dosage would be a suppository containing 500 mgs. taken twice daily.

In general, the minimum and maximum amounts of

*Table IV.—Effect of phenethylbiuret on various tests*

| Test Procedure | Dose, mg./kg. | Species | Observations |
| --- | --- | --- | --- |
| Anti-chromodacryorrhea | 256–512 I.P | Rats | No protection (15 min. pretreatment, 60 min. observation, 512 mg./kg. dose in lethal range). |
| Intestinal motility | 200–400 S.C | do | No inhibition (1 hour pretreatment). |
| Potentiation of loss of righting reflex: | | | |
| (a) Hexobarbital | 100 I.P | Mice | Potentiation (17.5±1.8 min. control vs. 23.9±2.3 treated). |
| (b) Ether | 100 I.P | Rats | Potentiation (2.2±1.5 min. control vs. 22.1±3.4 treated). |
| Conditioned avoidance | 30–150 I.P | do | Antagonism (24% at 100 mg./kg. P=0.05) neurological deficit at 150 mg./kg. |
| Histamine induced gastric secretion. | 100 I.V | Cat | Antagonism (50% decrease 3 of 4 cats 100 minutes after injection; no effect of free or total HCl). |
| Convulsions: | | | |
| (a) Pentylenetetrazole | 200 I.P | Mouse | Antagonism (control $ED_{50}$ 40 (36–44) mg./kg. vs. 60 (55–66) treated). |
| (b) Nicotine | 200 I.P | do | Antagonism (control $ED_{50}$ 2.1 (1.4–2.8) mg./kg. vs. 4 (3.3–4.9) treated). |

As shown above, Table IV summarizes briefly the results of the other pharmacological tests. The insoluble nature of the compound precluded testing by some of the usual methods.

No effect was observed with the compound against strychnine or picrotoxin-induced convulsions. However, active ingredient per dosage unit form would be 10 to 1000 mgs., with the recommended dosage being 100 mgs. taken from one to six times daily.

We claim:

1. A method of inhibiting gastric secretions which comprises administering to an animal with stomach ulcers a pharmacologically effective amount of a biuret having the formula

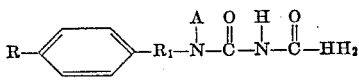

wherein
R is a radical selected from the group consisting of hydrogen, methyl and methoxy,
$R_1$ is alkylene having 2 to 4 carbon atoms, and
A is a radical selected from the group consisting of hydrogen and methyl.

2. A method of inhibiting gastric secretions which comprises administering to an animal with stomach ulcers a pharmacologically effective amount of phenethylbiuret.

3. A method of inhibiting gastric secretions which comprises administering to an animal with stomach ulcers a pharmacologically effective amount of 3-phenylpropylbiuret.

4. A method of inhibiting gastric secretions which comprises administering to an animal with stomach ulcers a pharmacologically effective amount of 4-phenylbutylbiuret.

5. A method of inhibiting gastric secretions which comprises administering to an animal with stomach ulcers a pharmacologically effective amount of N-methyl-N-phenethylbiuret.

6. A method of inhibiting gastric secretions which comprises administering to an animal a pharmacologically effective amount of p-tolylethylbiuret.

7. A method of inhibiting gastric secretions which comprises administering to an animal a pharmacologically effective amount of p-methoxyphenethylbiuret.

References Cited by the Examiner

UNITED STATES PATENTS 2,961,377  11/1960  Shapiro et al. _____ 260.—564

OTHER REFERENCES

Boggiano et al.: J. Pharm. & Pharmacol., vol. 13 (1961), pages 567–74.

Dunnigan et al.: J. Amer. Chem. Soc., vol. 75 (1953), pages 3615–16.

Shapiro et al.: J. Amer. Chem. Soc., vol. 81 (1959), pages 3728–9 of pages 3728–36.

JULIAN S. LEVITT, *Primary Examiner.*

NICHOLAS S. RIZZO, *Examiner.*

H. R. JILES, S. ROSEN, *Assistant Examiners.*